Figure 1:
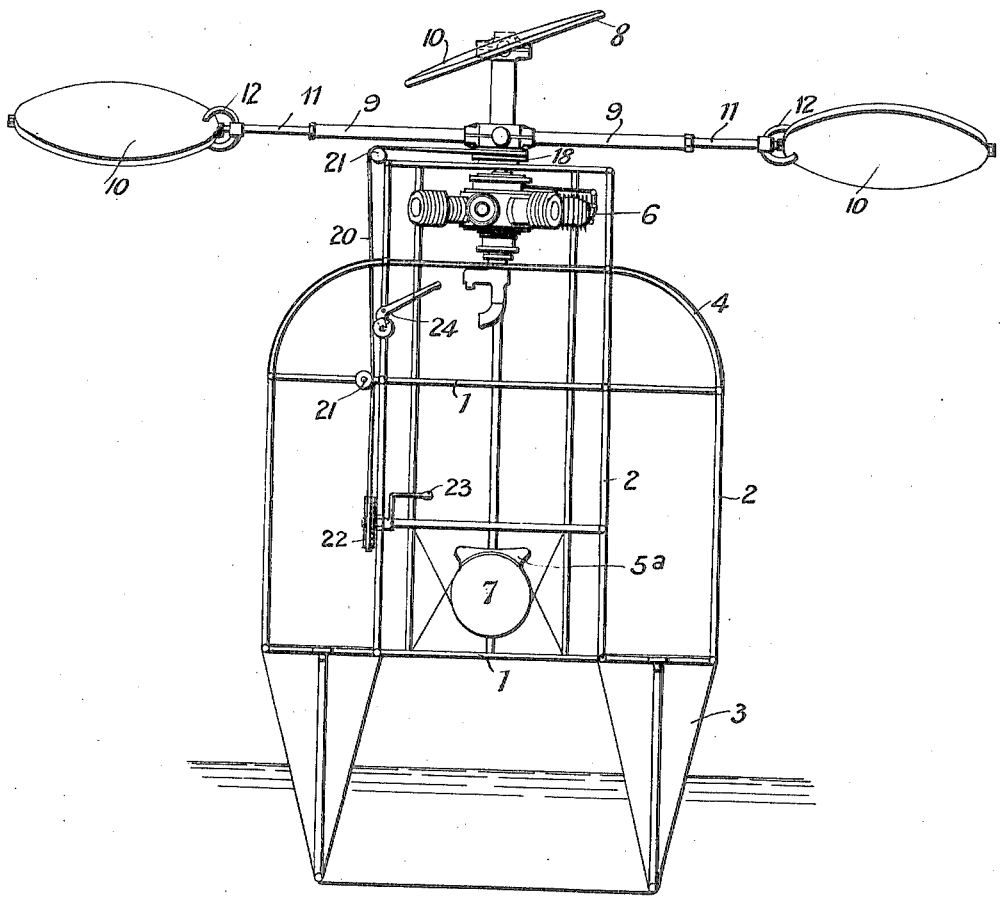

J. R. PORTER.
AERONAUTICAL MACHINE.
APPLICATION FILED JUNE 25, 1917.

1,291,126.

Patented Jan. 14, 1919.
2 SHEETS—SHEET 1.

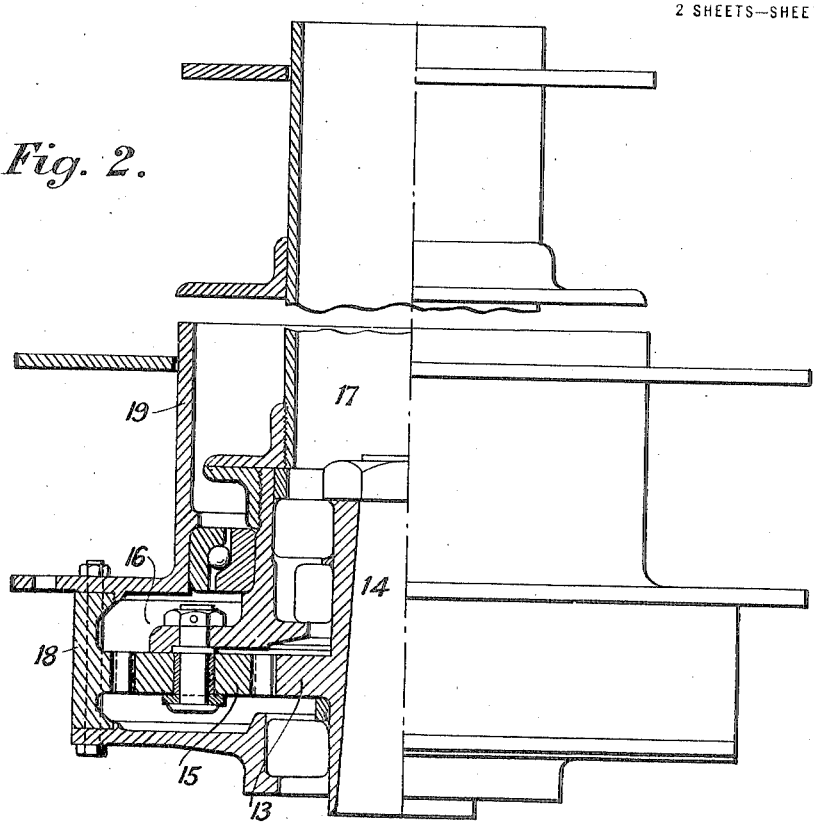
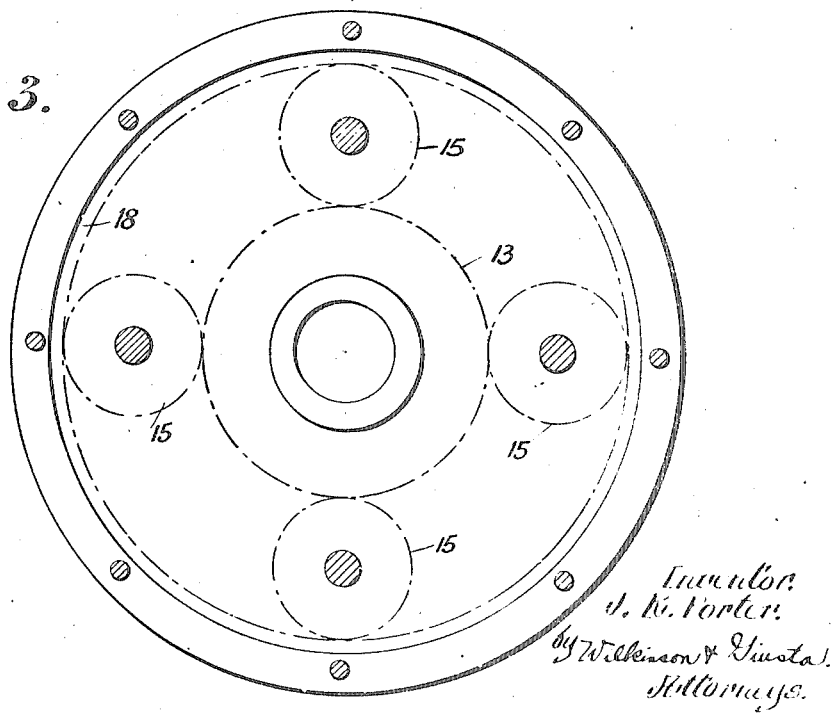

UNITED STATES PATENT OFFICE.

JAMES ROBERTSON PORTER, OF LONDON, ENGLAND.

AERONAUTICAL MACHINE.

1,291,126.   Specification of Letters Patent.   Patented Jan. 14, 1919.

Application filed June 25, 1917. Serial No. 176,801.

*To all whom it may concern:*

Be it known that I, JAMES ROBERTSON PORTER, civil engineer, residing at 9 Grays Inn Square, in the county of London, England, have invented a new and useful Improvement in and Relating to Aeronautical Machines, of which the following is a specification.

This invention relates to aeronautical machines, and embraces the helicopter and aeroplane principles, that is to say, a machine constructed according to my invention is designed to rise vertically or fly horizontally, or be deflected from a vertical flight into a horizontal flight.

A machine constructed according to my invention has a body circular in cross section, the axis of the engine being in the axis of the body, and the engine may be stationary, but preferably rotary.

On the shaft of the engine is keyed the sun wheel of an epicyclic or sun and planet gear. A screw propeller is mounted on a cylinder which forms part of or is secured to the annular spur wheel of the gear, and the planet wheels of the gear revolve on axles which are fixed in a plate carrying a cylinder to which arms are secured. Two or more of these arms carry at their ends aerofoils, the ends of the arms passing through the aerofoils, the aerofoils may be made so that they can turn freely upon the arms. The aerofoils on their arms are employed as helicopter propeller blades, and the screw propeller fixed to the annular wheel may be constructed in a similar manner.

The accompanying drawings are illustrative of my invention—

Figure 1 being a view of the machine in vertical section.

Figs. 2 and 3 illustrate the construction of the epicyclic or sun and planet gear.

Referring to Fig. 1, the machine is a frame-like structure comprising horizontally disposed rings 1 and vertical rods 2 all composed of light material such as metal tubes. At the base of the machine is an annular framework 3 which may be triangular in cross-section and which is covered with waterproof material; the annular frame-work serving to form a float to support the machine upon water. The top of the machine is covered with suitable material, 4, such as cloth, while within the machine a seat 5ª is provided for the pilot. The engine 6 is preferably of the rotary type and is mounted upon the top of the framework and is supplied with fuel from a tank 7 beneath the seat 5ª. The engine 6 drives through sun and planet gears as hereinafter described upper and lower propellers 8 and 9 disposed horizontally. Each propeller comprises radial arms provided at their outer ends with aerofoils 10 which latter are mounted upon rods 11 in such a manner that the angle of each aerofoil is capable of adjustment.

The means for rotating the propellers are illustrated in Figs. 2 and 3 and comprise a spur wheel 13 driven by the engine shaft 14, which spur wheel in turn drives planet wheels 15 mounted upon a plate 16 furnished with an upwardly extending hollow shaft 17 whereon are mounted the arms of the upper propeller. The planet wheels 15 drive an internally toothed annular spur wheel 18 whereon is mounted the hub 19 of the lower propeller. The two propellers are thus rotated in opposite directions.

For starting the propellers 8, 9, a belt 20 is passed around the annular spur wheel 18 and thence by way of guide pulleys 21 to a pulley 22 provided with a starting handle 23. The belt is controlled by a hand brake 24 convenient to the pilot and so arranged that by effecting a braking action upon the belt 20 the rotation of the annular spur wheel 18 is retarded and thereby also retarding the rotation of the lower propeller 9 driven by the said wheel.

To start the engine 6 the starting handle 23 is turned several times so that by means of the belt 20 the propellers are rotated. When the desired momentum has been attained the starting handle is released and the brake 24 is applied to the belt, thus reducing the speed of the one propeller and accelerating the speed of the other, which latter propeller then overcomes the compression and internal friction of the engine and causes the latter to start.

When the engine 6 is started the propellers rotate in opposite directions, and if the lower propeller is mounted so that its surfaces are immediately below those of the upper propeller, the latter will act upon the rotating air from the upper propeller in a manner similar to that of an aeroplane and a good lifting effect will be produced.

The torque of the engine, which, when driving a single directly coupled propeller, causes the frame to revolve when a vertical flight is attempted is in the present case eliminated, the available power being divided between the two propellers in such a way that the resistance of the lower propeller blades is sufficient to counteract the torque of the top propeller and the engine both of which run in the same direction. The machine can descend vertically by reducing the speed of the engine or cutting it off altogether, in the latter case the action of the air causes the aerofoils to act as gliders and rotate around the body of the machine causing a slow descent to land or water. The aerofoils may be of any shape, and, if circular, they can be fixed, as they are free to act as gliders without swiveling.

What I claim as my invention and desire to secure by Letters Patent is:—

1. In an aeronautical machine the combination with upper and lower horizontally disposed propellers and an engine for rotating said propellers, of sun and planet gear interposed between said engine and propellers for rotating the latter in opposite directions, a belt embracing said sun and planet gear, means for actuating said belt by hand to rotate said propellers, and a brake for controlling the movement of said belt, substantially as and for the purpose specified.

2. In an aeronautical machine the combination with an upper horizontally disposed propeller, a hollow shaft whereon said propeller is mounted, and a lower horizontally disposed propeller, of a rotary engine, a spur wheel rotatable with said engine, planet wheels in mesh with said spur wheel, a carrier for said planet wheels mounted upon the said hollow shaft of the upper propeller, an annular spur wheel in mesh with said planet wheels and a hollow hub mounted on said annular wheel and serving to support the said lower propeller, substantially as herein described.

3. An aeronautical machine comprising an upper and a lower horizontally disposed propeller each constructed with radial arms, aerofoil blades at the extremities of said arms, a body portion circular in cross section, a horizontally disposed rotary engine mounted coaxially with said body portion and above the latter, a spur wheel rotatable with the engine, planet wheels in mesh with said spur wheel, a carrier for said planet wheels, a hollow shaft mounted on said carrier and serving to support one of said propellers, an annular spur wheel in mesh with said planet wheels, and a hub mounted on said annular wheel and serving to support the other propeller, substantially as herein described.

4. An aeronautical machine comprising an upper and a lower horizontally disposed propeller each constructed with radial arms, aerofoil blades angularly adjustable at the extremities of said arms, a body portion circular in cross section, an annular float triangular in cross section at the base of said body portion, a horizontally disposed rotary engine mounted coaxially with said body portion and above the latter, a spur wheel rotatable with the engine, planet wheels in mesh with said spur wheel, a carrier for said planet wheels, a hollow shaft mounted on said carrier and serving to support one of said propellers, an annular spur wheel in mesh with said planet wheels, and a hub mounted on said annular wheel and serving to support the other propeller, substantially as described.

JAMES ROBERTSON PORTER.